UNITED STATES PATENT OFFICE.

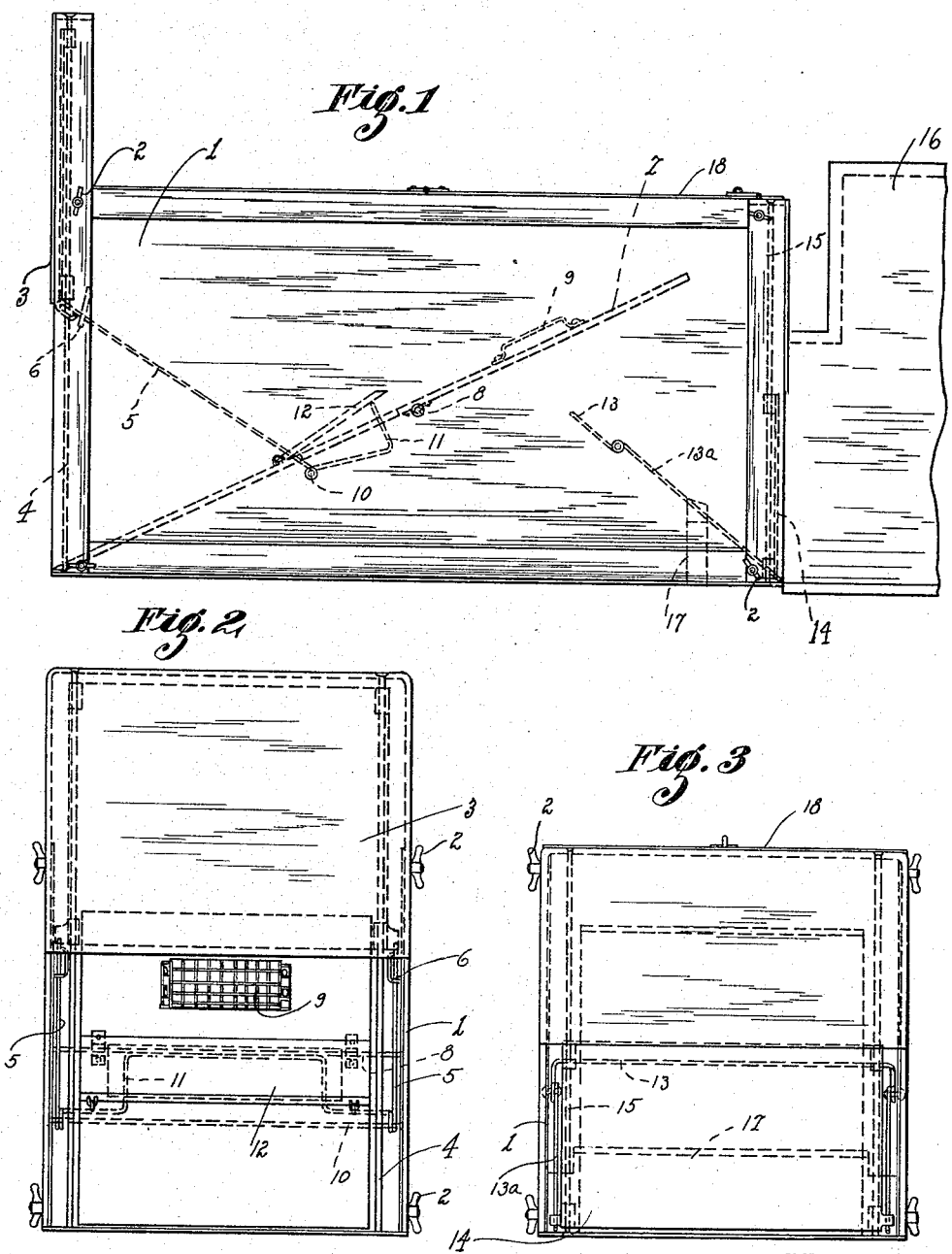

WILLIAM D. BLUDWORTH, OF FOLSOM, CALIFORNIA.

AUTOMATIC DOUBLE-ACTION RODENT-TRAP.

1,178,125.　　　　　Specification of Letters Patent.　　Patented Apr. 4, 1916.

Application filed May 26, 1915.　Serial No. 30,545.

*To all whom it may concern:*

Be it known that I, WILLIAM D. BLUDWORTH, a citizen of the United States, residing at Folsom, in the county of Placer, State of California, have invented certain new and useful Improvements in Automatic Double-Action Rodent-Traps; and I do declare the following to be a full, clear, and exact description of the same, reference being had to the accompanying drawings, and to the characters of reference marked thereon, which form a part of this application.

This invention relates to improvements in rodent traps for trapping rodents of all kinds and particularly squirrels, the object of the invention being to produce a trap for the purpose which will have two compartments, namely, an entrance or trap compartment, and in addition thereto, a delivery or caging compartment for holding a plurality of the rodents. The trap compartment is so arranged that as the rodent enters the trap the trap door closes behind him and as he advances farther into the trap another door opens in front of him into the caging compartment, and simultaneously therewith the original door is again set in open position. Then after the rodent has passed into the caging compartment the door of same automatically closes and the entire mechanism returns to normal set position ready for the entrance of another rodent. In this manner, the trap automatically catches and retains a number of the rodents in consecutive order just as rapidly as they can enter and leave the trap compartment.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a side elevation of the complete mechanism. Fig. 2 is a front elevation of the trapping compartment. Fig. 3 is a rear elevation of the same.

Referring now more particularly to the characters of reference on the drawings, the numeral 1 designates the trapping compartment which is made of any suitable material and is held together by four removable bolts 2, by means of which it can be readily taken apart for shipping or other purposes.

In practice the compartment 1 is provided with a front door 3 slidable upon two vertical side supporting rods 4. This door 3 is held normally in open position as shown in Figs. 1 and 2 by means of detent arms 5 normally projecting below the lower edge of the said door 3, such arms 5 working in guides 6. These guides 6 hold the arms 5 in position laterally and also limit their downward movement so that they will be normally held underneath the door 3 when it is in its open position.

The operating runway of the trap, as at 7, consists of a smooth runway pivotally mounted, as at 8, and is so balanced that in its normal position the same inclines from the lower opening of the door 3 upwardly into the compartment 1 to a point near the rear end thereof.

Near the upper end of the runway 7 I provide a suitable retaining means 9 for receiving grain or similar bait. The arms 5 are pivotally mounted on a rod 10 disposed in the compartment 1 and are provided with a detent 11 which projects from below the runway 7 through the opening therein to a point slightly above said runway, where it engages a tripping paddle 12 which is pivotally mounted on the runway 7.

The rodent, attracted by the bait in the retainer 9, enters the compartment 1 through the opening of the door 3 and advances along the runway 7. In so doing it steps on the tripping paddle 12 bringing the same into engagement with the detent 11, the movement of which acts to withdraw the arms 5 from engagement with the door 3, and the said door 3 then drops by gravity into closed position and rests on the lower end of the runway 7. With this action, the rodent is naturally frightened by what has occurred and in running from the noise of the dropping door 3, advances upon the upper end of the runway 7 causing the same to tilt upon its pivotal point 8, which action causes the runway 7 to lift the door 3 into engagement with the arms 5 again, thus automatically opening said door. As the runway 7 moves downwardly with this movement just described, it engages the end of a lever 13 with arms 13$^a$ which extend under the edges of a rear door 14 slidable vertically on vertical rods 15. The movement of the lever 13 raises the door 14 and leaves an opening from the compartment 1 into the cage compartment 16 into which the rodent enters. The weight of the rodent being released from the runway 7 such runway by reason of its previously described balance returns to the position shown in Fig. 1, and the rear door 14 closes with its own weight. This action thus catches the rodent in the compartment 16 and leaves the trapping compartment 1 in position for the reception and trapping of another rodent and so on. A cross stop 17 limits the downward movement of one end of the runway 7 so as to cause a fixed movement with each operation.

The device may be made of course of any suitable material or of any suitable size, and for trapping any desired form of rodents, and hence I have made no especial claim to size, shape or material.

The numeral 18 designates a hinged door on the top of the structure for easy admission to the bait retainer 9.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A device of the character described comprising a trapping compartment and a caging compartment, a front and rear door in the trapping compartment arranged to drop from open to closed position by gravity, means normally holding the front door open, means operable by the rodent upon entering the compartment to release said holding means to allow the front door to drop to closed position, means operable by the rodent while in said compartment to open both doors, said last named means being arranged to return to normal position upon the departure of the rodent from said compartment, whereupon the rear door may drop to closed position as described.

2. A device of the character described comprising a trapping compartment and a caging compartment, a front door on said trapping compartment slidable vertically, detent arms normally holding said door in open position, an inclined runway pivotally mounted within said compartment, a detent on said arms projecting through said runway, a tripping paddle on said runway engageable with said detent and arranged to actuate the same to release said arms from said door, the lower end of said inclined runway being engageable with said door to lift the same to open position upon said runway being tilted, as described.

3. A device of the character described comprising a trapping compartment and a caging compartment, a sliding door at the front and rear of the trapping compartment, such doors being arranged to drop from opened to closed position by gravity, a pair of arms normally holding the front door in open position, a lever fulcrumed within the compartment and provided with arms normally projecting under the rear door when it is in closed position, an inclined runway pivotally mounted within the trapping compartment and normally projecting in the path of the front door, a member carried by the inclined runway and engageable with the front door arms to release them from engagement with the door, said lever being engageable by the inclined platform when it is tilted to cause the arms on said lever to move the rear door to open position, as described.

In testimony whereof I affix my signature in presence of two witnesses.

WILLIAM D. BLUDWORTH.

Witnesses:
 FLOYD M. BLANCHARD,
 MABEL G. BOARD.

Copies of this patent may be obtained for five cents each, by addressing the "Commissioner of Patents, Washington, D. C."